Aug. 31, 1937.  P. L. SPENCER  2,091,693

TEMPERATURE INDICATING DEVICE

Filed April 22, 1936

INVENTOR
PERCY L. SPENCER
BY Elmer J. Gorin
ATTORNEY

Patented Aug. 31, 1937

2,091,693

UNITED STATES PATENT OFFICE 2,091,693

TEMPERATURE-INDICATING DEVICE

Percy L. Spencer, West Newton, Mass., assignor to Raytheon Manufacturing Company, Newton, Mass., a corporation of Delaware Application April 22, 1936, Serial No. 75,735

9 Claims. (Cl. 73—353)

This invention relates to temperature-indicating devices, and more particularly to such devices for use in indicating the temperature of liquids.

One of the objects of this invention is to devise a body which when supported so as to be free to turn will rotate into various positions to indicate the temperature of said body by its position.

Another object of this invention is to devise such a body which when floated in a liquid will indicate the temperature of the liquid by its position.

A still further object of this invention is to devise a body, such as described above, which is simple, durable, and accurate in its operation.

The foregoing and other objects of this invention will be best understood from the following description of exemplifications thereof, reference being had to the accompanying drawing, wherein.

Figure 1:
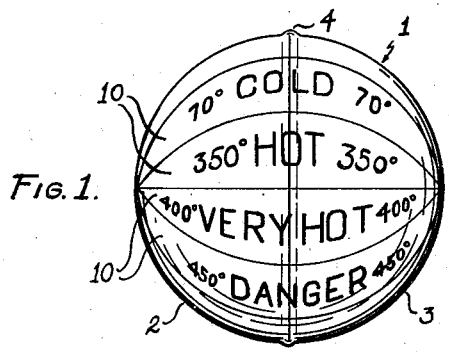
Fig. 1 is a side view of one embodiment of my invention.
Figure 2:
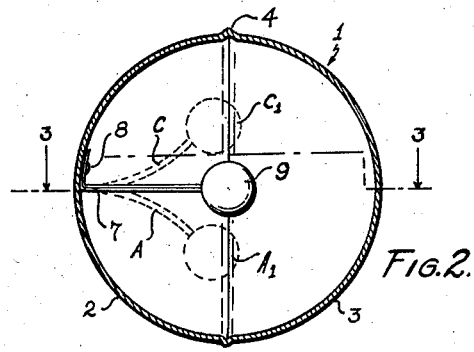
Fig. 2 is a cross-sectional view of the device shown in Fig. 1.
Figure 3:
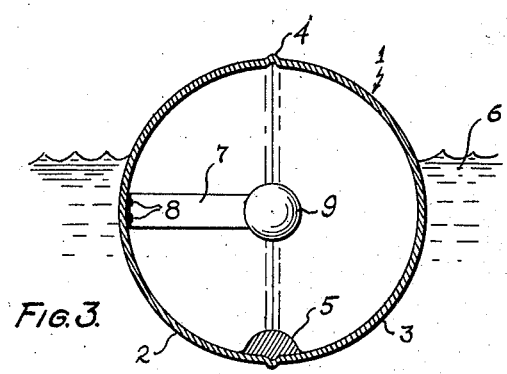
Fig. 3 is a section taken substantially along the line 3—3 of Fig. 2, and showing the device floating in a liquid.

In bodies of liquid maintained at various temperatures, it is desirable to have a simple temperature-indicating device which when put into the liquid will indicate the temperature thereof. This is particularly desirable in connection with deep fat frying. The device shown in Figs. 1, 2 and 3 is particularly useful for indicating the temperature of such liquids. In these figures, the device shown consists of a hollow sphere 1 of some good heat-conducting material, preferably metal. The sphere 1 may be made of two hemispherical halves 2 and 3 which are secured together along a seam 4 to form the sphere 1. At one side of the interior of this sphere 1 is fastened a weight 5 so that when the sphere is floated in a liquid 6, it will tend to float in a position with the weight 5 at the bottom. In order to cause the sphere 1 to rotate into different positions in the liquid 6 as the temperature of said liquid changes, there is secured to the inner wall of the sphere 1 a strip of thermostatic metal 7. One end of this strip of thermostatic metal is secured to the inner wall of the sphere 1 by any convenient means, such as, for example, by rivets 8 or by being spot-welded thereto. At the free end of the thermostatic strip 7 is supported a weight 9. I prefer to make the length of the thermostatic strip 7 of such a value that at least in one position of the strip the weight 9 is located at the center of the sphere 1. However, this particular relationship is not an essential part of the operation of my device.

The sphere 1 floating in the liquid 6 will assume the temperature of the liquid 6. When the temperature is low, the thermostatic strip 7 may be in position A, as indicated by the dotted lines in Fig. 2, and the weight 9 may be in a corresponding position $A_1$. As the temperature of the liquid increases, the thermostatic strip will move gradually into the position as indicated by the solid lines in Fig. 2 and also beyond that position to the position as indicated by the dotted lines C. Under those conditions the weight 9 will assume a position $C_1$. Thus it will be seen that as the temperature of the liquid 6 changes, the weight 9 will be shifted progressively through the interior of the sphere 1. This, as will be described below, will cause the sphere 1 to rotate in the liquid 6. In order to indicate the temperature of the liquid, the outside of the sphere 6 may be divided into segments 10, each of which may carry some temperature-indicating inscription. As shown, the temperature of the liquid may be expressed in descriptive terms, such as "cold", "hot", "very hot", and "danger", or the segments may be calibrated in degrees as indicated.

Figure 4:
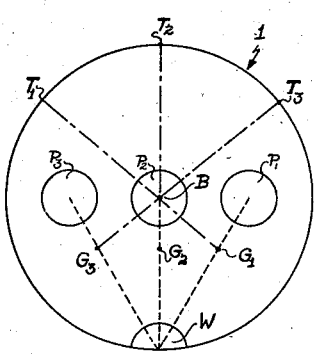
Fig. 4 is a diagram for the purpose of illustrating the mode of operation of the device shown in Figs. 1, 2 and 3.

In order to explain the operation of the device, reference may be had to Fig. 4, which represents an approximation of the conditions which exist in the device as described above but which nevertheless illustrates the principle of operation thereof. In Fig. 4 the weight of the sphere 1 may be assumed as being concentrated at W. Since the sphere 1 is symmetrical, the center of buoyancy thereof will be located at B. When the weight 9 is located at $P_1$, the center of gravity of the sphere 1 will lie somewhere along the dotted line connecting $P_1$ and W at a point indicated at $G_1$. A body floating in a liquid will tend to turn into such a position that the center of buoyancy and the center of gravity lie along a vertical line with the center of gravity below the center of buoyancy. Thus under the conditions described, the sphere 1 will rotate so that the point $T_1$ will lie at the top of the sphere. As the weight 9 moves into the position $P_2$, the center of gravity will move into the position G₂, and therefore the sphere 1 will tend to locate in the liquid with the point T₂ uppermost. As the temperature of the sphere 1 further changes so that the weight 9 moves into the position P₃, the center of gravity will move into the position G₃, and the sphere 1 will turn so that the point T₃ is uppermost. If the sphere 1 is calibrated so as to carry temperature-indicating indicia at T₁, T₂ and T₃, the temperature of the liquid in which the sphere 1 floats can be determined by whichever temperature-indicating mark is uppermost on the sphere 1.

Figure 5:
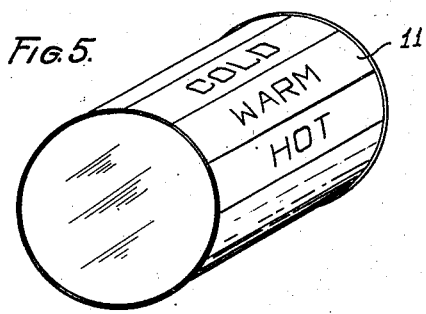
Figs. 5 and 6 are perspective views of two additional forms of my invention.
Figure 6:
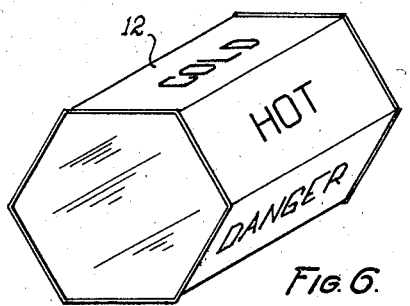

As indicated above, the form of my temperature-indicating device is preferably that of a sphere because if the device comes into contact with the side walls of the vessel which contains the liquid whose temperature is to be measured, since only a point contact can exist between the sphere and the side walls of the vessel, there is very little if any tendency for such contact to prevent rotation of the device into its proper temperature-indicating position. However, it is possible to make the temperature-indicating device in various shapes. For example, the device may take the form of a cylinder 11, as shown in Fig. 5, or of the hexagonal body 12, as shown in Fig. 6. In each of these forms the thermostatic strip will be mounted on one of the end walls of the device so that the weight will move across the interior of the device, shifting the center of gravity with respect to the center of buoyancy as discussed above.

Figure 7:
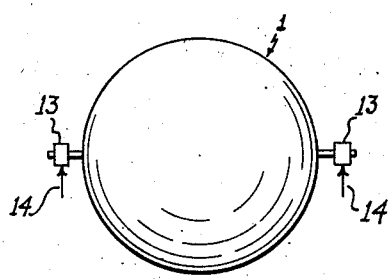
Fig. 7 is a diagrammatic view of another arrangement embodying the principles of my invention.

Although I have described my device as being supported by being floated in a liquid, it is possible to utilize certain principles of my invention in other arrangements. If the device is supported so that it is free to rotate as the center of gravity shifts, such rotation will take place, thereby indicating the temperature thereof. For example, I have shown in Fig. 7 the sphere 1 supported along one diameter thereof so that it is free to turn in bearings 13 which may be supported by any suitable supporting forces indicated by the arrows 14. In such an arrangement the center of support exists at the center of the sphere 1 in the same way as the center of buoyancy in the device shown in Figs. 1 to 4, inclusive, exists at the center of the sphere. Under these conditions when the center of gravity within the sphere 1 of Fig. 7 is shifted with respect to the center of support, the sphere 1 will rotate to bring the center of support and the center of gravity in a vertical line with each other. Sphere 1 supported in this manner will by its position indicate the ambient temperature of the medium surrounding it.

This invention is not limited to the particular details of construction as described above as many equivalents will suggest themselves to those skilled in the art. It is accordingly desired that the appended claims be given a broad interpretation commensurate with the scope of the invention within the art.

What is claimed is:

1. A temperature-indicating device comprising a body adapted to be supported with the center of support located at a definite point with respect to said body, a strip of thermostatic material fastened at one end thereof to said body, a weight carried by said thermostatic strip at a point removed from said end, said thermostatic strip being adapted to move under the action of varying temperature to shift said point and said weight with respect to said body in a direction to shift the center of gravity of said body with respect to said center of support, said body being adapted to rotate under the action of the forces exerted upon it by its support and by gravity to bring the center of gravity into a vertical line with said center of support, whereby the angular orientation of said body is made responsive to the temperature thereof.

2. A temperature-indicating device comprising a body adapted to be floated in a liquid whose temperature is to be measured, and means responsive to the temperature of said body for moving the center of gravity of said body with respect to the center of buoyancy of said body, whereby said body rotates under the action of the forces exerted upon it by the liquid and by gravity to bring the center of gravity into a vertical line with said center of buoyancy, thus making the angular orientation of said body responsive to the temperature of said liquid.

3. A temperature-indicating device comprising a spherical body adapted to be supported with the center of support located at a definite point with respect to said body, a strip of thermostatic material fastened at one end thereof to said body, a weight carried by said thermostatic strip at a point removed from said end, said thermostatic strip being adapted to move under the action of varying temperature to shift said point and said weight with respect to said body in a direction to shift the center of gravity of said body with respect to said center of support, said body being adapted to rotate under the action of the forces exerted upon it by its support and by gravity to bring the center of gravity into a vertical line with said center of support, whereby the angular orientation of said body is made responsive to the temperature thereof.

4. A temperature-indicating device comprising a spherical body adapted to be floated in a liquid whose temperature is to be measured, and means responsive to the temperature of said body for moving the center of gravity of said body with respect to the center of buoyancy of said body, whereby said body rotates under the action of the forces exerted upon it by the liquid and by gravity to bring the center of gravity into a vertical line with said center of buoyancy, thus making the angular orientation of said body responsive to the temperature of said liquid.

5. A temperature-indicating device comprising a hollow body adapted to be supported with the center of support located at a definite point with respect to said body, a strip of thermostatic material fastened at one end thereof to the interior wall of said body, a weight carried by said thermostatic strip at a point removed from said end, said thermostatic strip being adapted to move under the action of varying temperature to shift said point and said weight with respect to said body in a direction to shift the center of gravity of said body, said body being adapted to rotate under the action of the forces exerted upon it by its support and by gravity to bring the center of gravity into a vertical line with said center of support, whereby the angular orientation of said body is made responsive to the temperature thereof.

6. A temperature-indicating device comprising a hollow body adapted to be floated in a liquid whose temperature is to be measured, a strip of thermostatic material fastened at one end thereof to the interior wall of said body, a weight carried by said thermostatic strip at a point removed from said end, said thermostatic strip being adapted to move under the action of varying temperature to shift said point and said weight with respect to said body in a direction to shift the center of gravity of said body, whereby said body rotates under the action of the forces exerted upon it by the liquid and by gravity to bring the center of gravity into a vertical line with said center of buoyancy, thus making the angular orientation of said body responsive to the temperature of said liquid.

7. A temperature-indicating device comprising a hollow body adapted to be supported with the center of support located at a definite point with respect to said body, a strip of thermostatic material fastened at one end thereof to the interior wall of said body, a weight carried by said thermostatic strip at a point removed from said end, said thermostatic strip being adapted to move under the action of varying temperature to shift said point and said weight with respect to said body in a direction to shift the center of gravity of said body, and an additional weight secured in said body at a point displaced from said center of support to keep the center of gravity of said body at all times displaced from said center of support, said body being adapted to rotate under the action of the forces exerted upon it by its support and by gravity to bring the center of gravity into a vertical line with said center of support, whereby the angular orientation of said body is made responsive to the temperature thereof.

8. A temperature-indicating device comprising a hollow body adapted to be floated in a liquid whose temperature is to be measured, a strip of thermostatic material fastened at one end thereof to the interior wall of said body, a weight carried by said thermostatic strip at a point removed from said end, said thermostatic strip being adapted to move under the action of varying temperature to shift said point and said weight with respect to said body in a direction to shift the center of gravity of said body, and an additional weight secured in said body at a point displaced from said center of buoyancy to keep the center of gravity of said body at all times displaced from said center of buoyancy, whereby said body rotates under the action of the forces exerted upon it by the liquid and by gravity to bring the center of gravity into a vertical line with said center of buoyancy, thus making the angular orientation of said body responsive to the temperature of said liquid.

9. A temperature-indicating device comprising a body adapted to be supported with the center of support located at a definite point with respect to said body, a strip of thermostatic material supported on said body, a weight movable by said thermostatic strip, said thermostatic strip being adapted to move under the action of varying temperature to shift said weight with respect to said body in a direction to shift the center of gravity of said body with respect to said center of support, said body being adapted to rotate under the action of the forces exerted upon it by its support and by gravity to bring the center of gravity into a vertical line with said center of support, whereby the angular orientation of said body is made responsive to the temperature thereof.

PERCY L. SPENCER.